(12) United States Patent
Saito et al.

(10) Patent No.: US 8,390,163 B2
(45) Date of Patent: Mar. 5, 2013

(54) ELECTRIC ROTATING MACHINE AND HYBRID CAR PROVIDED WITH THE SAME

(75) Inventors: Yasuyuki Saito, Hitachinaka (JP); Tsuyoshi Goto, Hitachinaka (JP); Noriaki Hino, Mito (JP); Katsuhiro Hoshino, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 658 days.

(21) Appl. No.: 12/392,700

(22) Filed: Feb. 25, 2009

(65) Prior Publication Data

US 2009/0224623 A1 Sep. 10, 2009

(30) Foreign Application Priority Data

Mar. 4, 2008 (JP) ................................. 2008-052794

(51) Int. Cl.
*H02K 21/12* (2006.01)

(52) U.S. Cl. ............... 310/156.53; 310/156.57

(58) Field of Classification Search ............. 310/156.53, 310/156.57
See application file for complete search history.

(56) References Cited

U.S. PATENT DOCUMENTS

| | | | | |
|---|---|---|---|---|
| 4,930,201 | A | * | 6/1990 | Brown ............................. 29/598 |
| 5,581,140 | A | * | 12/1996 | Futami et al. ............. 310/156.53 |
| 6,208,054 | B1 | | 3/2001 | Tajima et al. |
| 6,242,837 | B1 | | 6/2001 | Matsunobu et al. |
| 2001/0002094 | A1 | * | 5/2001 | Tajima et al. ............. 310/156.53 |
| 2004/0007930 | A1 | * | 1/2004 | Asai et al. ................. 310/156.53 |
| 2005/0023920 | A1 | * | 2/2005 | Tajima et al. ............. 310/156.53 |
| 2005/0040723 | A1 | * | 2/2005 | Asai et al. ................. 310/156.53 |
| 2005/0110356 | A1 | * | 5/2005 | Imamura et al. ......... 310/156.53 |
| 2005/0134134 | A1 | * | 6/2005 | Mori et al. ............... 310/156.53 |
| 2005/0156474 | A1 | * | 7/2005 | Endo ........................ 310/156.53 |
| 2005/0269888 | A1 | * | 12/2005 | Utaka ....................... 310/156.53 |
| 2006/0028082 | A1 | * | 2/2006 | Asagara et al. ........... 310/156.53 |
| 2006/0113858 | A1 | | 6/2006 | Hino et al. |
| 2006/0284508 | A1 | * | 12/2006 | Tajima et al. ............. 310/156.53 |
| 2007/0063607 | A1 | * | 3/2007 | Hattori ..................... 310/156.53 |
| 2008/0231135 | A1 | * | 9/2008 | Suzuki et al. ............. 310/156.53 |

FOREIGN PATENT DOCUMENTS

| | | |
|---|---|---|
| JP | 10-126985 A | 5/1998 |
| JP | 11-164501 A | 6/1999 |
| JP | 2002-305859 A | 10/2002 |
| JP | 2005-117796 A | 4/2005 |

(Continued)

OTHER PUBLICATIONS

Translation of foreign document JP 2002305859 A.*
Corresponding Chinese Office Action dated Dec. 6, 2010 with English Translation (Eight (8) pages).
Chinese Office Action dated Jul. 13, 2010 (three (3) pages).

*Primary Examiner* — Quyen Leung
*Assistant Examiner* — Alex W Mok
(74) *Attorney, Agent, or Firm* — Crowell & Moring LLP (57) ABSTRACT

An electric rotating machine includes a stator, a rotor inserted in a bore of the stator such that an air gap is formed between the stator and the rotor, and a plurality of permanent magnets embedded in a peripheral portion of the rotor core of the rotor in a circumferential arrangement. Slits are formed in portions of the rotor core each extending between the adjacent magnetic poles. Compressive stress is induced in portions of the rotor core each extending between the slit and the permanent magnet when stress is induced in the portion of the stator core extending between the slit and the permanent magnet by centrifugal force produced when the rotor rotates and acting on the permanent magnet and a pole piece covering the permanent magnet.

13 Claims, 8 Drawing Sheets

FOREIGN PATENT DOCUMENTS

| | | |
|---|---|---|
| JP | 2005-124333 A | 5/2005 |
| JP | 2005-287265 A | 10/2005 |
| JP | 2006-74887 A | 3/2006 |
| JP | 2006-187189 A | 7/2006 |

* cited by examiner

ELECTRIC ROTATING MACHINE AND HYBRID CAR PROVIDED WITH THE SAME

BACKGROUND OF THE INVENTION

The present invention relates to an electric rotating machine and a hybrid car provided with the same.

There has been a demand for an electric rotating machine, more specifically, a permanent-magnet-type electric rotating machine for driving a vehicle, including an inverter for controlling the same having a reduced size and capable of providing an increased output power. There has been a demand particularly for a permanent-magnet-type electric rotating machine capable of producing high torque at low operating speeds and of providing high output power at high rotating speeds. Therefore, the conventional permanent-magnet-type electric rotating machine is an embedded permanent-magnet-type electric rotating machine with salient poles using low field magnets for high-speed rotation and capable of using reluctance torque. See, for example, JP-A 1998-126985.

A rotor core on the side of a permanent-magnet stator and a rotor core on the side of the center axis of a permanent-magnet rotor are connected by a bridge for enhancing the mechanical strength withstanding the centrifugal force. See, for example, JP-A 2006-187189.

A permanent-magnet-type electric rotating machine for driving a vehicle is required to produce a very high torque for conformation. Usually, the output torque of an electric rotating machine can be increased by increasing the current supplied to the stator coils. However, an increased current increases heat generated by the electric rotating machine and, therefore, a thermal requirement places a limit on current density. Thus, the magnetic flux of the permanent magnets of the permanent-magnet-type electric rotating machine needs to be effectively used to make the permanent-magnet-type electric rotating machine produce the highest possible torque.

The effective magnetic flux of the permanent magnets of the embedded permanent-magnet-type electric rotating machine can be increased by embedding the permanent magnets at a small depth to reduce leakage flux. The embedded permanent-magnet-type electric rotating machine for driving a vehicle is operated at high rotating speeds. Therefore, the permanent magnets of the embedded-magnet type electric rotating machine needs to have mechanical strength sufficient for securely holding the embedded permanent magnets in place against centrifugal force that acts on the permanent magnets and capable of withstanding operations at high rotating speeds.

When the bridge is used for enhancing the mechanical strength withstanding the centrifugal force, it is possible that the effective magnetic flux of the permanent magnets is less than that of a electric rotating machine not provided with any bridge because the bridge is a magnetic member similar to the core.

SUMMARY OF THE INVENTION

Accordingly, it is an object of the present invention to provide an electric rotating machine provided with permanent magnets and capable of withstanding operations at high rotating speeds without reducing the effective magnetic flux of the permanent magnets and to provide a hybrid car provided with the same electric rotating machine.

The present invention provides an electric rotating machine having a rotor and a core holding permanent magnets, in which compressive stress is induced in the core when the rotor rotates.

Thus, the present invention provides an electric rotating machine capable of withstanding operations at high rotating speed without reducing the effective magnetic flux of the permanent magnets and a hybrid car provided with the same electric rotating machine.

BRIEF DESCRIPTION OF THE DRAWINGS

The above and other objects, features and advantages of the present invention will become apparent from the following description taken in connection with the accompanying drawings.

DESCRIPTION OF THE PREFERRED EMBODIMENTS

Preferably, a permanent-magnet-type electric rotating machine has a rotor including a rotor core in which compressive stress is intentionally induced to reduce tensile stress that may be induced in the rotor core when the rotor rotates. Preferably, the absolute value of the compressive stress is equal to that of the tensile stress.

More specifically, the rotor core is provided with magnet holding cavities respectively holding permanent magnets therein, nonmagnetic parts disposed on the opposite sides, respectively, of each magnet holding cavity, and slits formed in the circumference of the rotor core on the outer side of the nonmagnetic parts in a depth greater than the distance between the circumference of the rotor and each nonmagnetic part. Preferably, the bottom of the slit is nearer to the center of the magnetic pole of the rotor than the open end of the slit. Preferably, the thickness along the circumference of the rotor of a part of the rotor core, extending between the slit and the non-magnetic member is substantially equal to the thickness along the circumference of the rotor of a part of the rotor core extending between the bottom of the slit and the magnet holding cavity.

The preferred embodiments are described below with reference to the accompanying drawings.

Figure 1:
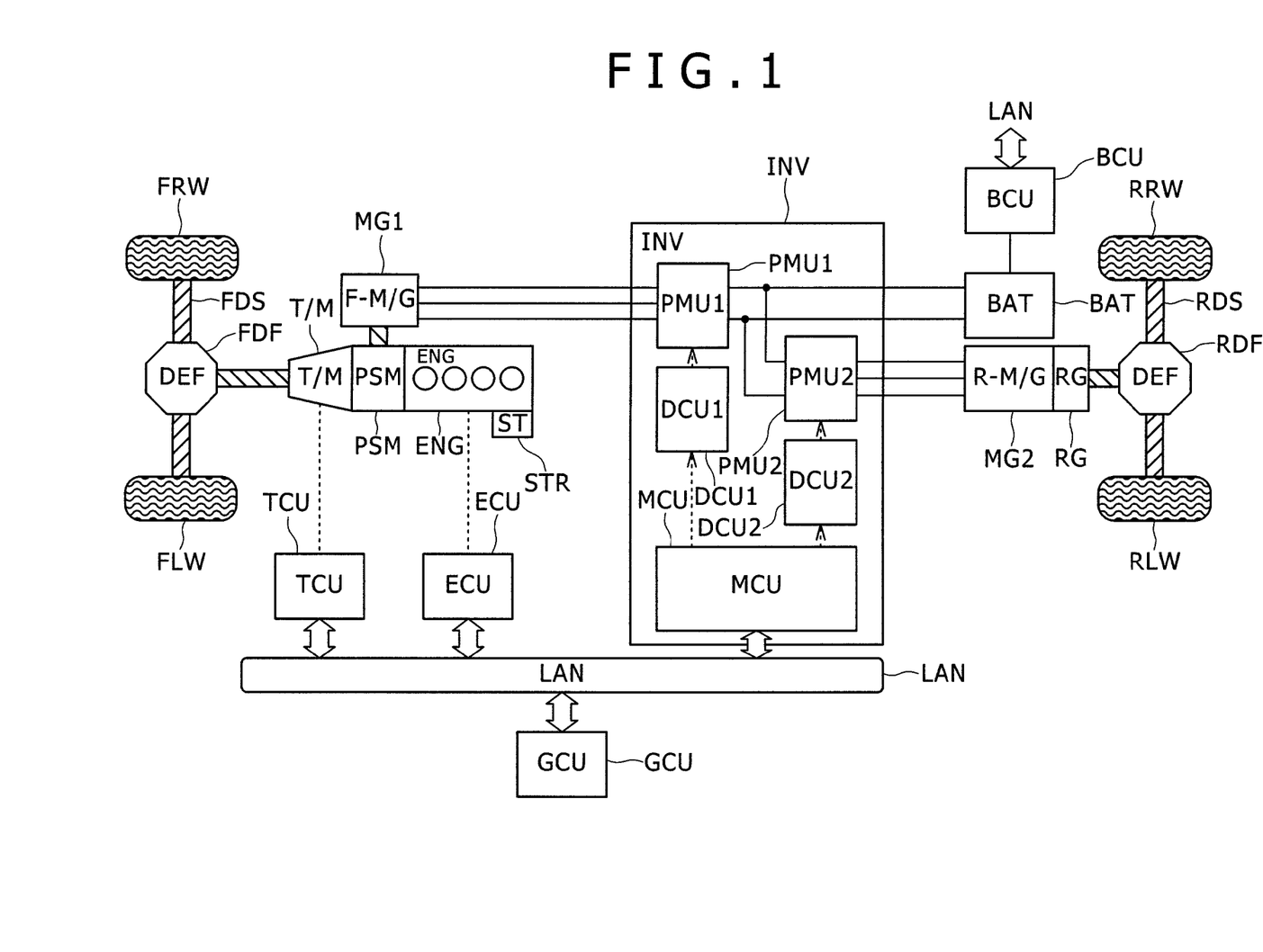
FIG. 1 is a block diagram of a hybrid car provided with a motor generator, namely, an electric rotating machine, in a first embodiment according.

The constitution of a hybrid electric car provided with motor generators are described with reference to FIG. 1. The hybrid electric car is provided with two different types of power plants.

The hybrid electric car is a four-wheel drive vehicle provided with an internal combustion engine (hereinafter, referred to simply as "engine") ENG, a front motor generator MG1 for driving front wheels FRW and FLW, and a rear motor generator MG2 for driving rear wheels RRW and RLW. The description herein assumes that the front wheels FRW and FLW are driven by the engine ENG and the front motor generator MG1, and the rear wheels RRW and RLW are driven by the rear motor generator MG2. However, the front wheels FRW and FLW may be driven by the front motor generator MG1, and the rear wheels RRW and RLW may be driven by engine ENG and the rear motor generator MG2.

Front axles FDS supporting the front wheels FRW and FLW are connected mechanically through a front differential FDF to a transmission T/M. The front motor generator MG1 and the engine ENG are connected mechanically through a transfer PSM to the transmission T/M. The transfer PSM divides input power and delivers divided power. The ac side of an inverter INV is connected electrically to the stator windings of the front motor generator MG1. The inverter INV is a power converter for converting dc power into three-phase ac power. The inverter INV controls the operation of the front motor generator MG1. The dc side of the inverter INV is connected electrically to a battery BAT.

The rear motor generator MG2 is connected mechanically through a reduction gear RG and a rear differential RDF to rear axles RDS supporting the rear wheels RRW and RLW. The stator windings of the rear motor generator MG2 are electrically connected to the ac side of the inverter INV. The inverter INV is common to the motor generators MG1 and MG2. The inverter INV includes a power module PMU1 and a drive circuit DCU1 for the front motor generator MG1, and power module PMU2 and a drive circuit DCU2 for the rear motor generator MG2, and a motor control unit MCU.

A starting motor STR is combined with the engine ENG. The starting motor STR is included in a starting system for starting the engine ENG.

The engine control unit ECU calculates values for controlling operations of components of the engine ENG including a throttle valve, fuel injection valves and such on the basis of input signals received from sensors and other controllers. The engine control unit ECU gives control signals carrying the calculated values to drivers for driving the components of the engine ENG.

Operations of the transmission T/M are controlled by a transmission control unit TCU. The transmission control unit TCU calculates values for controlling operations of a transmission gear on the basis of input signals received from sensors and other controllers. The transmission control unit TCU gives control signals carrying calculated values to a driver for driving the transmission gear to control the operations of the transmission gear of the transmission T/M.

The battery BAT is a high-voltage lithium-ion battery having a high terminal voltage of 200 V or above. A battery control unit BCU manages operations for charging and discharging the battery BAT and the life of the battery BAT. Signals indicating the terminal voltage of the battery BAT and a current supplied by the battery BAT are given to the battery control unit BCU. The hybrid electric car is provided with a low-voltage battery, not illustrated, having a terminal voltage of 12 V. The low-voltage battery is a power supply for the control system, the radio, lights, and other such equipment.

The engine control unit ECU, the transmission control unit TCU, the motor control unit MCU and the battery control unit BCU are electrically interconnected and are electrically connected to a general control unit GCU by an in-vehicle local area network LAN. Thus, the control units can transmit signals in a two-way communication mode, can exchange information and can use detected values in common. The general control unit GCU gives control signals to the control units according to the operating condition of the hybrid vehicle. The general control unit GCU calculates a torque necessary for accelerating the hybrid electric car in response to a driver's request for acceleration requested by the driver by operating the accelerator pedal, divides the calculated necessary torque into a torque to be produced by the engine ENG and a torque to be produced by the front motor generator MG1 so that the engine ENG may operate efficiently, and gives a control signal carrying the torque to be produced by the engine ENG to the engine control unit ECU and gives a control signal carrying the torque to be produced by the front motor generator MG1 to the motor control unit MCU.

The operation of the hybrid electric car is described below.

The front motor generator MG1 drives the front wheels FRW and FLW when the hybrid electric car is started and while the hybrid electric car is running at a low running speed, in which the operation efficiency of the engine ENG is low and the fuel consumption rate is high. Although the description is made herein on an assumption that the front motor generator MG1 drives the front wheels FRW and FLW when the hybrid electric car is started and while the hybrid electric car is running at a low running speed, the front motor generator MG1 and the rear motor generator MG2 may drive the front wheels FRW and FLW and the rear wheels RRW and RLW, respectively, in a four-wheel drive mode. Dc power is supplied to the inverter INV from the battery BAT. The inverter INV converts the received dc power into three-phase ac power. The three-phase ac power is supplied to the stator windings of the front motor generator MG1 to drive the front motor generator MG1. The output rotational power of the front motor generator MG1 is transmitted through the transfer PSM to the transmission T/M. The transmission T/M changes the input rotating speed. The output rotational power of the transmission T/M is transmitted to the front differential FDF. The front differential FDF distributes the rotational power to the front right and the front left axle FDS to drive the front axles FDS for rotation.

While the hybrid electric car is running in a normal running mode on a dry road, in which the engine ENG is operating at a high efficiency at a low fuel consumption rate, the engine ENG drives the front wheels FRW and FLW. Therefore, the output rotational power of the engine ENG is transmitted through the transfer PSM to the transmission T/M. The transmission T/M changes the input rotating speed. The output rotational power of the transmission T/M is transmitted through the front differential FDF to the front axles FDS to drive the front wheels FRW and FLW for rotation. The state of charge of the battery BAT is detected, and, if the battery needs charging, the output rotational power of the engine ENG is distributed through the transfer PSM to the front motor generator MG1 to drive the front motor generator MG1. Then, the front motor generator MG1 functions as a generator to generate three-phase ac power by the stator windings thereof. The three-phase ac power thus generated is converted into a predetermined dc power by the inverter INV. The output dc power of the inverter INV is supplied to the battery BAT to charge the battery BAT.

While the hybrid electric car is running in a four-wheel drive mode on a snowy road or the like, in which the engine is operating at a high efficiency and at a low fuel consumption rate, the rear motor generator MG2 drives the rear wheels RRW and RLW, and the engine ENG drives the front wheels FRW and FLW in the same mode as the normal running mode. Since the electric charge stored by the battery BAT is decreased by the driving of the front motor generator MG1, the engine ENG drives the front motor generator MG1 to charge the battery BAT. Since the rear motor generator MG2 drives the rear wheels RRW and RLW, dc power is supplied to the inverter INV from the battery BAT. The inverter INV converts the input dc power into three-phase ac power and supplies the three-phase ac power to the stator windings of the rear motor generator MG2 to drive the rear motor generator MG2. The rear motor generator MG2 thus driven generates rotational power. The output rotational power is distributed to the right and the left rear axle RDS by the rear differential RDF to drive the rear axles RDS for rotation. Thus the rear wheels RRW and RLW are driven for rotation.

The engine ENG and the front motor generator MG1 drive the front wheels FRW and FLW to accelerate the hybrid electric car. Although this embodiment is supposed to accelerate the hybrid electric car by driving the front wheels FRW and FLW by the engine ENG and the front motor generator MG1, the front wheels FRW and FLW may be driven by the engine ENG and the front motor generator MG1 and the rear wheels RRW and RLW may be driven by the rear motor generator MG2 to accelerate the hybrid electric car; that is, the hybrid electric car may be accelerated by four-wheel drive. The output rotational power of the engine ENG and the front motor generator MG1 are transmitted through the transfer PSM to the transmission T/M. The transmission T/M changes the input rotating speed. The output rotational power of the transmission T/M is transmitted through the front differential FDF to the front axles FDS to drive the front wheels FRW and FLW for rotation.

When the hybrid electric car is in a regenerative braking mode, in which the brake pedal is depressed, the stroke of the accelerator pedal is decreased or the accelerator pedal is released for deceleration, the rotational forces of the front wheels FRW and FLW are transmitted through the front axles FDS, the front differential FDF, the transmission T/M, and the transfer PSM to the front motor generator MG1 to drive the front motor generator MG1 to operate the front motor generator MG1 as a generator. Three-phase ac power generated in the stator windings of the front motor generator MG1 is supplied to the inverter INV. The inverter INV converts the input three-phase ac power into predetermined dc power and supplies the dc power to the battery BAT to charge the battery BAT. On the other hand, the rotational forces of the rear wheels RRW and RLW are transmitted through the rear axles RDS, the rear differential RDF and the reduction gear RG to the rear motor generator MG2 to drive the rear motor generator MG2 for power generation. Thus, three-phase ac power is generated in the stator windings of the rear motor generator MG2. The output three-phase ac power of the rear motor generator MG2 is supplied to the inverter INV. The inverter INV converts the input three-phase ac power into predetermined dc power and supplies the dc power to the battery BAT to charge the battery BAT.

Figure 2:
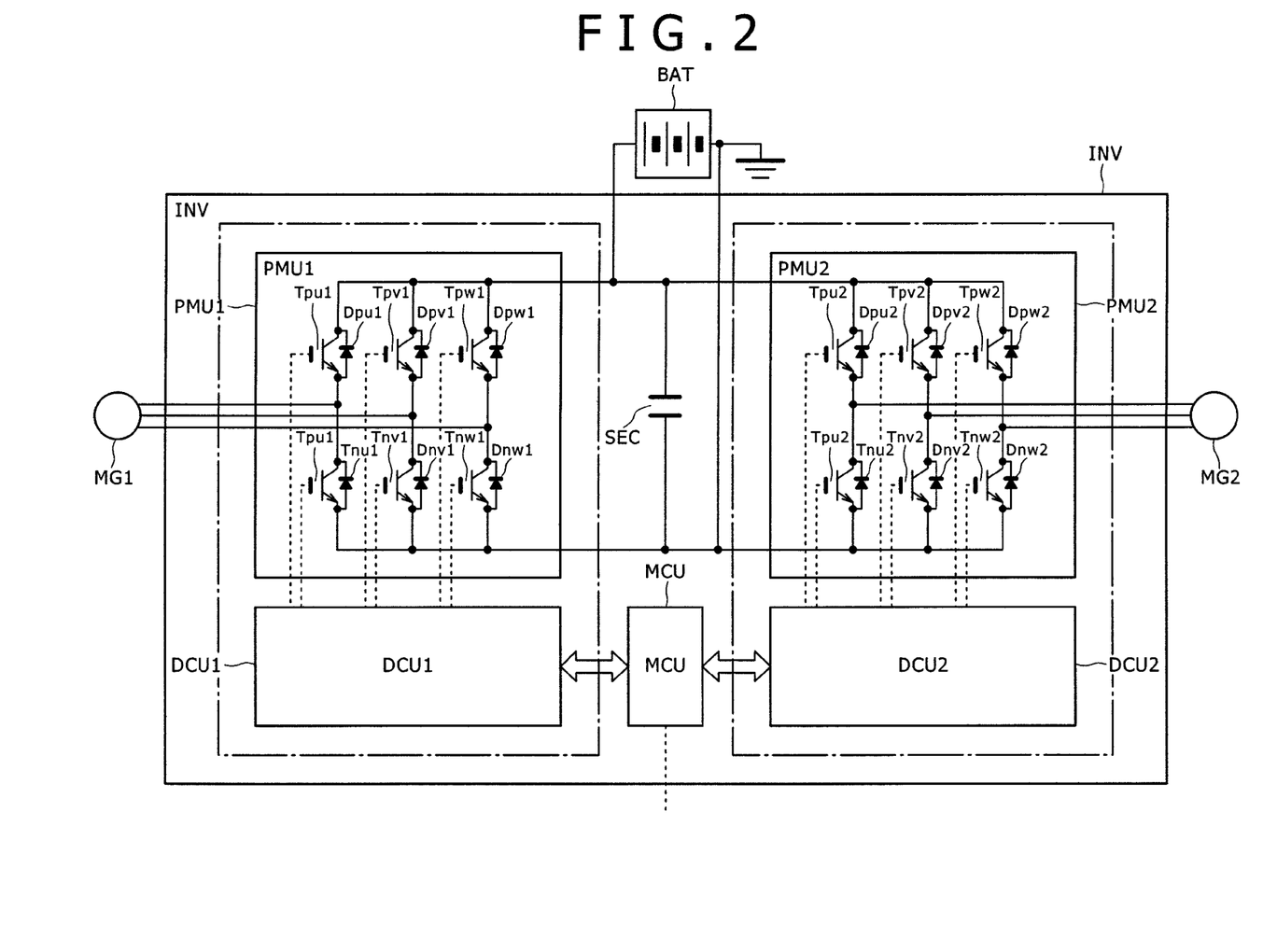
FIG. 2 is a circuit diagram of an inverter illustrated in FIG. 1.

FIG. 2 illustrates the configuration of the inverter INV.

As mentioned above, the inverter INV includes power modules PMU1 and PMU2, drive circuits DCU1 and DCU2, and motor control unit MCU. The power modules PMU1 and PMU2 are typically the same in configuration. The drive circuits DCU1 and DCU2 are typically the same in configuration.

The power modules PMU1 and PMU2 have conversion circuits, namely, main circuits, that convert dc power supplied thereto from the battery BAT into ac power and supply the ac power to the motor generators MG1 and MG2, respectively. The conversion circuits also convert ac power supplied thereto from the corresponding motor generators MG1 and MG2 into dc power and supply the dc power to the battery BAT.

The conversion circuits are bridge circuits each having three series circuits for three phases electrically connected in parallel to the positive and the negative poles of the battery BAT. The series circuits are called arms and each arm includes two semiconductor devices.

Each arm for a phase is formed by electrically connecting a power semiconductor device on the side of an upper arm and a power semiconductor on the side of a lower arm in series. This embodiment uses IGBTs (insulated-gate field-effect bipolar transistors), i.e., switching semiconductor devices, as the power transistors. A semiconductor chip forming the IGBT is provided with three electrodes, namely, a collector electrode, an emitter electrode, and a gate electrode. A diode chip is connected electrically to the collector and the emitter electrode of the IGBT such that a direction from the emitter electrode toward the collector electrode of the IGBT is a forward direction. In some cases a MOSFET (metal oxide semiconductor field-effect transistor) is used as the power semiconductor device instead of the IGBT. When a MOSFET is used instead of the IGBT, the diode is omitted.

The emitter electrode of the power semiconductor device Tpu1 and the collector electrode of the power semiconductor device Tnu1 are electrically connected in series to form a U-phase arm of the power module PMU1. A V-phase arm and a W-phase arm have the same construction as the U-phase arm. The emitter electrode of the power semiconductor device Tpv1 and the collector electrode of the power semiconductor device Tnv1 are electrically connected in series to form a V-phase arm of the power module PMU1. The emitter of the semiconductor device Tpw1 and the collector electrode of the power semiconductor device Tnw1 are electrically connected in series to form a W-phase arm of the power module PMU1. The arms of the power module PMU2 are formed by connecting the electrodes thereof in the same relation as those of the power module PMU1.

The collector electrodes of the power semiconductor devices Tpu1, Tpv1, Tpw1, Tpu2, Tpv2, and Tpw2 are electrically connected to the positive electrode of the battery BAT. The emitter electrodes of the power se devices Tnu1, Tnv1, Tnw1, Tnu2, Tnv2, and Tnw2 are electrically connected to the negative terminal of the battery BAT.

The middle point of the U-phase arm (the V-phase arm and the W-phase arm), namely, the joint of emitter electrode of the power semiconductor device on the side of the upper arm and the collector electrode of the power semiconductor device on the side of the lower arm, of the power module PMU1 is electrically connected to the U-phase (V-phase and the W-phase) stator windings of the front motor generator MG1.

The middle point of the U-phase arm (the V-phase arm and the W-phase arm), namely, the joint of emitter electrode of the power semiconductor device on the side of the upper arm and the collector electrode of the power semiconductor device on the side of the lower arm, of the power module PMU2 is electrically connected to the U-phase (V-phase and the W-phase) stator windings of the front motor generator MG2.

A smoothing electrolytic capacitor SEC is electrically connected to the positive and the negative electrodes of the battery BAT to suppress the variation of dc voltage caused by the operation of the power semiconductor devices.

The drive circuits DCU1 and DCU2 are driving units that provide-drive signals on the basis of a control signal provided by the motor control unit MCU to drive the power semiconductor devices of the power modules PMU1 and PMU2. The drive circuits, DCU1 and DCU2 are formed by connecting circuit parts including insulated power supplies, interface circuits, drive circuits, sensing circuits and snubber circuits, which are not illustrated.

The motor control unit MCU is an arithmetic unit included in a microcomputer. The motor control unit MCU receives input signals and gives control signals for operating the power semiconductor devices of the power modules PMU1 and PMU2 to the drive circuits DCU1 and DCU2. Input signals include torque signals τ*1 and τ*2, detected current signals Iu1, Iv1, Iw1, Iu2, Iv2, and Iw2, and magnetic pole position signals θ1 and θ2.

The torque signals τ*1 and τ*2 are provided according to the operating mode of the hybrid electric car by a host controller. The torque signals τ*1 and τ*2 are for the front motor generator MG1 and the rear motor generator MG2, respectively. The detected current signals Iu1, Iv1, and Iw1 indicate input currents supplied respectively to the U-phase, V-phase, and W-phase stator windings of the front motor generator MG1, respectively. The detected current signals Iu2, Iv2, and Iw2 indicate input currents supplied respectively to the U-phase, V-phase, and W-phase stator windings of the rear motor generator MG2, respectively. The detected current signals Iu1, Iv1, Iw1, Iu2, Iv2, and Iw2 are detected by a current sensor, such as current transformer CT. The magnetic pole position signal θ1 indicates the angular position of the magnetic pole of the front motor generator MG1 measured by a magnetic pole position measuring device, such as a resolver, an encoder, a Hall element, or a Hall IC. The magnetic pole position signal θ2 indicates the angular position of the magnetic pole of the rear motor generator MG2 measured by a magnetic pole position measuring device, such as a resolver, an encoder, a Hall element or a Hall IC.

The motor control unit MCU calculates voltage control values on the basis of input signals and gives control signals, namely, PWM signals (pulse-width modulating signals), carrying the calculated voltage control values for operating the power semiconductor devices Tpu1 to Tnw1 of the power module PMU1 and the power semiconductor devices Tpu2 to Tnw2 of the power modules PMU2 to the drive circuits DCU1 and DCU2.

Generally, the PWM signal provided by the motor control unit MCU indicates time-averaged voltage varying in a sine curve. Since an instantaneous maximum output voltage is equal to the voltage of a dc line connected to the inverter, the effective value of the voltage varying in a sine curve is $1/\sqrt{2}$ of the maximum output voltage. In the hybrid car, the effective value of the input voltage applied to the motor is increased to increase the output of the motor by the limited inverter. That is, the motor control unit MCU provides a PWM signal having only an on-state and an off-state like a rectangular-wave signal. Thus, the peak value of a rectangular wave is equal to the voltage Vdc of the dc line of the inverter and hence the effective value is Vdc. Thus, the highest effective value is obtained.

However, when the rectangular voltage wave is used, inductance is small in a low rotating speed range, and the current wave varies irregularly. Consequently, unnecessary vibratory force is generated in the motor and noise is generated. Therefore, a control operation using the rectangular voltage wave is executed only while the motor is operating at high rotating speeds and the ordinary PWM control is executed while the motor is operating at low rotating speeds.

Figure 3:
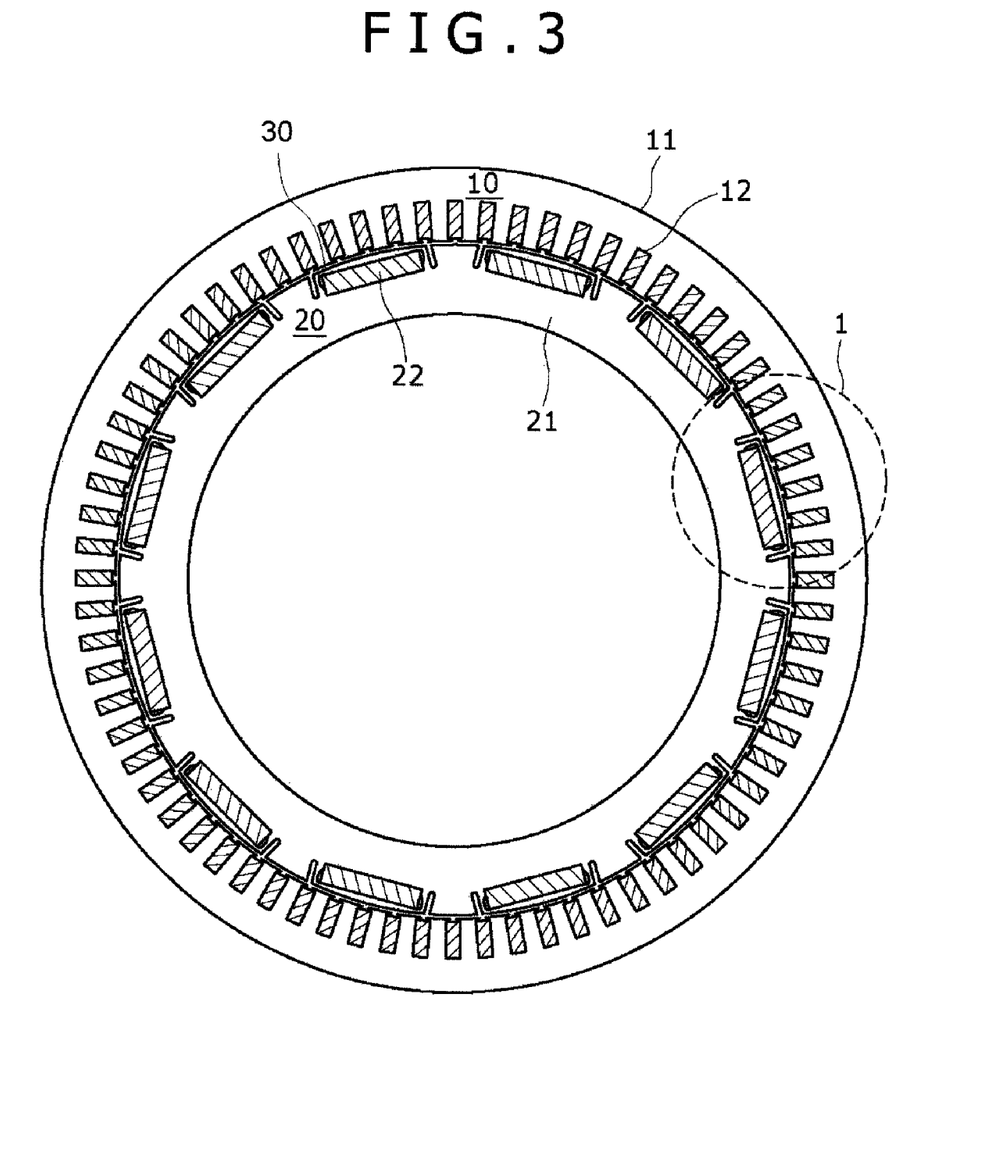
FIG. 3 is a cross-sectional view of the motor generator illustrated in FIG. 1.
Figure 4:
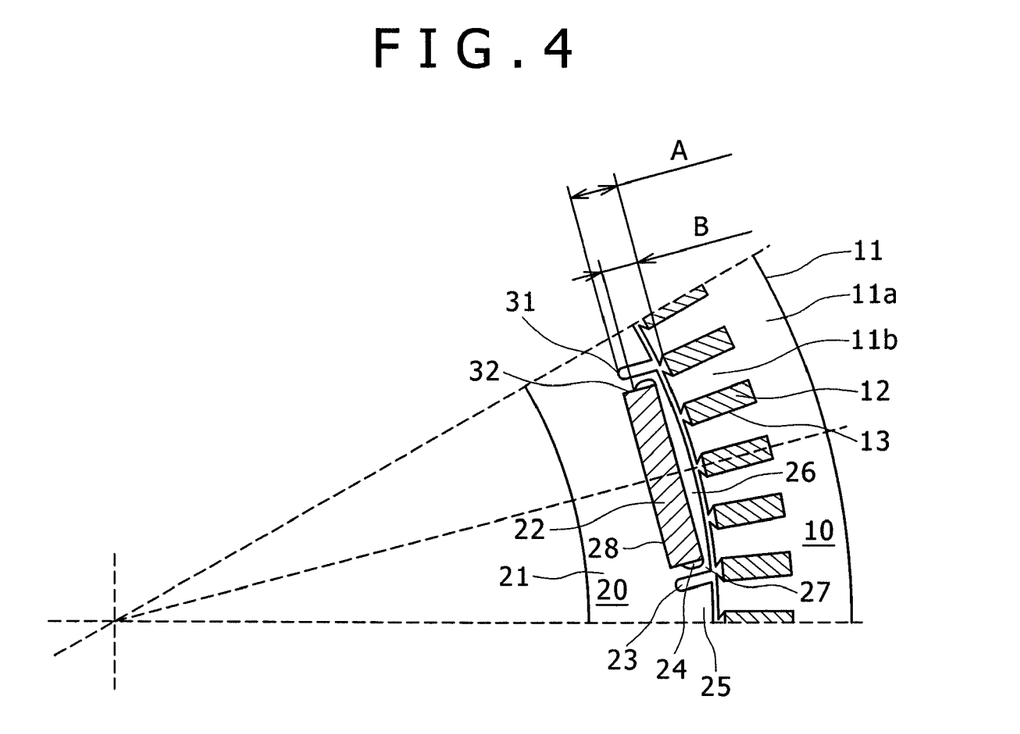
FIG. 4 is an enlarged, fragmentary cross-sectional view of the motor generator illustrated in FIG. 1.

FIGS. 3 and 4 illustrate the front motor generator MG1.

In this embodiment, the front motor generator MG1 is described as an embedded-magnet type three-phase synchronous motor by way of example. The front motor generator MG1 and the rear motor generator MG2 are typically constructed in a similar manner.

Although an electric rotating is applicable to the foregoing hybrid electric car provided with the inverter and the drive system, the present invention is not limited thereto in its practical application and is applicable to any suitable electric rotating machines provided with an embedded-magnet type rotor.

Referring to FIG. 3, the motor generator includes a stator 10, and a rotor 20 inserted in the stator 10. An annular air gap 30 is formed between the stator 10 and the rotor 20. The stator 10 is fixedly attached to a housing, not illustrated, and the rotor 20 is rotatably supported on the housing.

FIG. 4 is an enlarged view of a part 1 surrounded by a circle illustrated in FIG. 3. The stator 10 has a stator core 11 and stator windings 12. The stator core 11 is formed by axially stacking a plurality of magnetic laminations, such as a plurality of silicon steel plates. The stator core 11 has a yoke part, namely, a core back, and a tooth part, namely, a protruding part or a salient pole part. The yoke part has a cylindrical yoke core 11a, namely, a core back, fitted in the housing. The tooth part has a plurality of core teeth 11b protruding radially inward from the inner circumference of the yoke core 11a and circumferentially arranged at predetermined angular intervals. In this embodiment, the number of the core teeth 11b is seventy-two; however, any suitable number may be used. Thus, the stator 10 has seventy-two stator magnetic poles.

Seventy-two axial slots 13 opening toward the rotor 20 and the core teeth 11b are arranged alternately. Insulators, not illustrated, are placed in the seventy-two slots 13. The U-phase, V-phase, and W-phase stator windings are fitted in the slots 13. In this embodiment, the stator windings 12 are wound in a distributed winding system. The distributed winding system winds a phase winding in two slots 13 separated by a plurality of slots 13 on the stator core 11. Since the windings are wound in the distributed winding system, the motor generator G1 can be controlled for operation at rotating speeds in a wide range, from a low rotating speed to a high rotating speed by using field-weakening control and reluctance torque.

The rotor 20 has a rotor core 21 and permanent magnets 22. The rotor core 21 is formed by stacking a plurality of annular magnetic laminates, such as a plurality of annular silicon steel plates. In this embodiment, twelve permanent-magnet holding grooves 28 are formed in the circumference of the rotor core 21 at equal angular intervals so as to extend between the opposite ends of the rotor core 21; however, any suitable number may be used. The same number of recesses is formed at the same positions, in the same shape and in the same size in peripheral parts of the annular silicon steel plates before stacking. The permanent-magnet holding grooves are formed necessarily when the silicon steel plates thus processed are stacked.

Permanent magnets 22 serving as magnetic poles are fitted in the permanent-magnet holding grooves 28. Thus the twelve permanent magnets 22 are embedded in the circumference of the rotor core 21 to form the rotor 20. The further description of this embodiment is made on the assumption that the rotor 20 has twelve magnetic poles.

The permanent magnets 22 of reverse polarities, are fitted in the permanent-magnet holding grooves 28 such that N-poles and S-poles are arranged alternately. An auxiliary magnetic pole 25 is formed in a part of the rotor core 21 between the adjacent permanent magnets 22. The auxiliary magnetic pole 25 forms a bypass magnetic circuit bypassing a magnetic circuit formed by the permanent magnet 22. The magnetomotive force of the stator 10 produces magnetic flux directly in the auxiliary magnetic poles 25 of the rotor 10. The outer surface of each permanent magnet 22 is covered with a pole piece 26. The pole piece 26 forms a magnetic circuit of the magnetic flux of the permanent magnet 22.

Since both torque produced by the magnetic flux of the permanent magnets 22 and reluctance torque produced by the magnetic flux passing the auxiliary magnetic poles 25 can be used, the efficiency of the motor generator MG1 can be improved. Since the auxiliary magnetic poles 25 can execute field-weakening control, the high-speed operating range of the motor generator MG1 can be widened. Since the pole pieces 26 are magnetic members, the pulsating magnetic flux of the stator magnetic poles can be moderated.

Nonmagnetic parts 24, namely, magnetic gaps, are formed on the circumferentially opposite sides of each permanent magnet 22, namely, the magnetic pole of the rotor 20. The nonmagnetic parts 24 moderate magnetic flux density distributions of the magnetic flux of the permanent magnet 22 on the circumferentially opposite sides of the permanent magnet 22. The nonmagnetic parts 24 are continuous with the permanent-magnet holding groove 28. When the permanent magnet 22 is fitted in the permanent-magnet holding groove 28, the nonmagnetic parts 24 are formed contiguously with the circumferentially opposite ends of the permanent magnet 22. The nonmagnetic parts 24, similar to the permanent-magnet holding groove 28, extend axially between the opposite ends of the rotor 20. The nonmagnetic parts 24 may be filled with a filler, such as varnish. The nonmagnetic parts 24 reduce cogging torque. The nonmagnetic part 24 makes the radial thickness of a magnetic path 27 formed in a peripheral part of the rotor 20 smaller than the radial thickness of the permanent magnet 22, which reduces the leakage flux of the permanent magnet 22. Typically, the radial thickness of the magnetic path 27 is half the radial thickness of the permanent magnet 22 or below.

A slit 23 is formed in the circumference of the rotor 20 at a position near a part of the nonmagnetic part 24 apart from the circumferential end of the permanent magnet 22. The depth A of the slit 23 is greater than the depth B of the nonmagnetic part 24.

Figure 5:
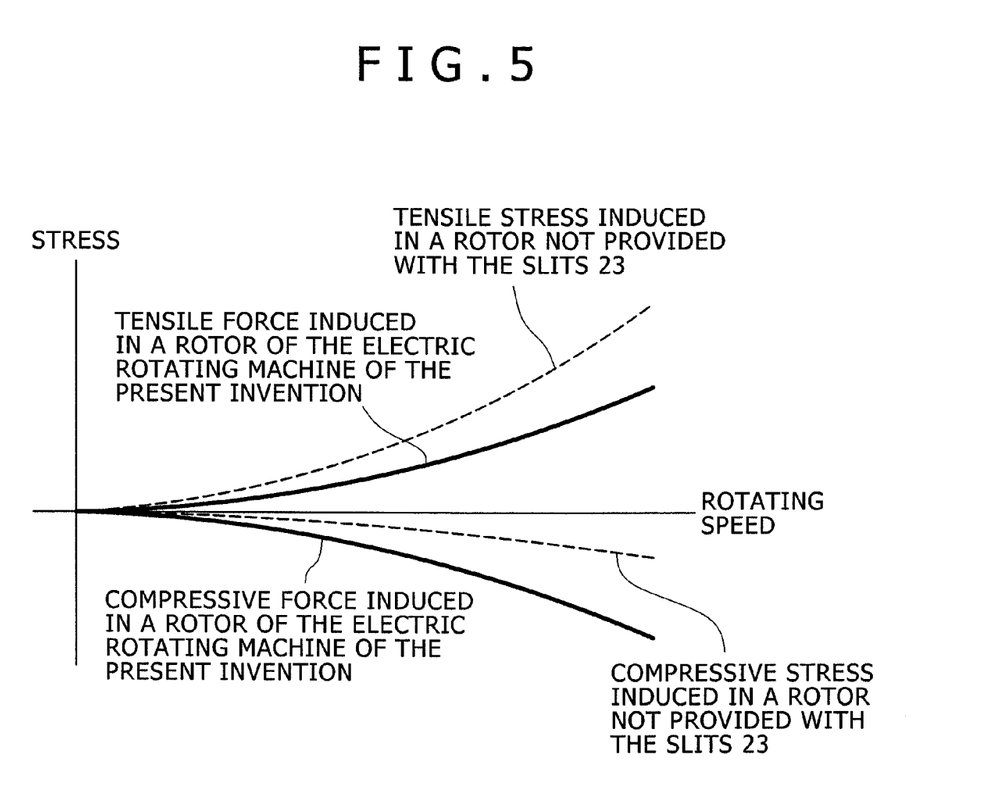
FIG. 5 is a graph illustrating the variation of stresses induced in the rotor of the motor generator illustrated in FIG. 1 with the rotating speed of the rotor.

FIG. 5 is a graph illustrating the variations of the stress induced in the rotor 20 provided with the slits 23 and the stress induced in a rotor not provided with the slits 23 with the rotating speed of the rotors. In FIG. 5, stress is measured on the vertical axis and rotating speed is measured on the horizontal axis.

Referring to FIG. 5, in the rotor not provided with the slits 23, the absolute value of tensile stress is greater than the absolute value of compressive stress. Those stresses are induced by centrifugal force that acts on the rotor core 21 and the permanent magnets 22 when the rotor rotates. Those stresses increase in proportion to the square of rotating speed. The stresses act in directions substantially parallel to the circumference of the rotor. A maximum tensile stress is induced in a part of the magnetic path 27 extending between the pole piece 26 and the auxiliary magnetic pole 25 on the side of the nonmagnetic part 24. The absolute value of the compressive stress induced in a part of the magnetic path 27 on the side of the stator 10 is smaller than that of tensile stress.

The respective absolute values of the compressive stress and the tensile stress induced in the rotor 20 illustrated in FIG. 4 are approximately equal to each other. The tensile stress induced in the rotor core 21 of the rotor 20 is lower than that induced in the rotor core of the rotor not provided with the slits 23. The slit 23 has an effect on inducing compressive stress in a part 32 of the rotor core 21 when the rotor 20 rotates to reduce the tensile stress induced in the rotor core 21. The tensile stress is induced in a part 31. In other words, the parts in which compressive stress are induced disperse the stress induced in the rotor core 21.

Parts of the rotor core 21 circumferentially contiguous with the permanent magnet 22 have parts that induce compressive stress when stress is induced in parts of the rotor core 21 circumferentially contiguous with the permanent magnet 22, namely, the magnetic paths 27 of the rotor core 21 contiguous with the permanent magnet 22, by centrifugal force acting on the permanent magnet 22 and the pole piece 26 on the radially outer side of the permanent magnet 22 when the rotor 20 rotates. Preferably, the absolute value of the increased compressive stress is equal to that of the tensile stress. The magnetic path 27 functions like a spring to disperse the stresses.

Figure 6:
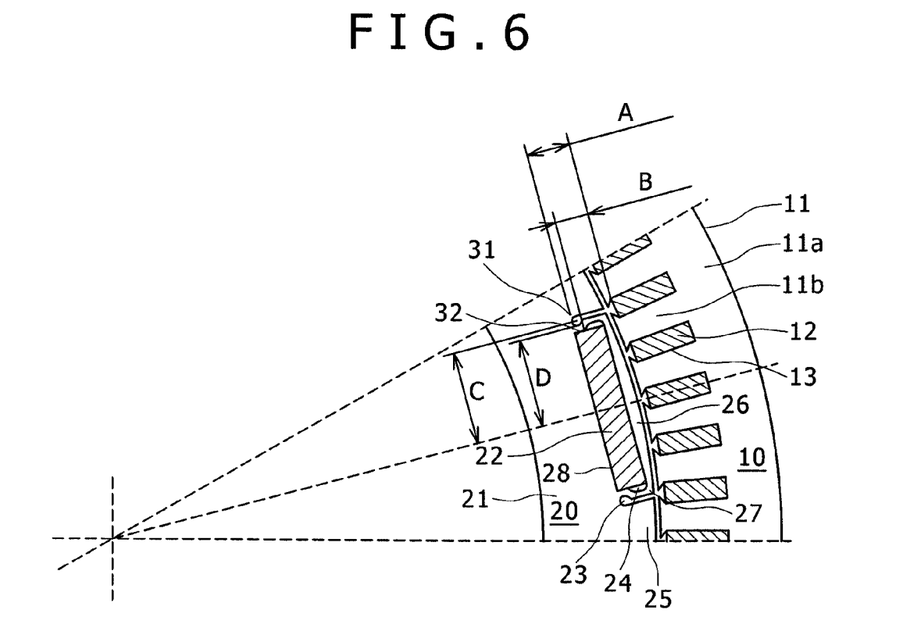
FIG. 6 is an enlarged, fragmentary cross-sectional view of a motor generator in a second embodiment.

FIG. 6 illustrates a motor generator MG1 in a second embodiment. Features other than those described below are the same as those of the motor generator MG1 in the first embodiment.

In this embodiment, a slit 23 is formed, similar to that illustrated in FIG. 4, in the circumference of a rotor 20 at a position near a part of a nonmagnetic part 24 apart from the circumferential end of a permanent magnet 22. The depth A of the slit 23 is greater than the depth B of the nonmagnetic part 24. The distance D between the center of the permanent magnet 22 and the bottom of the slit 23 is shorter than the distance C between the center of the permanent magnet 22 and the open end of the slit 23. Parts of the rotor core 21 circumferentially contiguous with the permanent magnet 22 are curved from nonmagnetic parts 24 toward the permanent magnet 22.

Consequently, large auxiliary magnetic poles 25 can be formed and the motor generator MG1 can operate at a higher efficiency. Parts 31 in which tensile stress is induced can be formed in a circular shape greater than the open ends of the slits 23, which is expected to reduce tensile stress still further. A part of the rotor core 21 between the slit 23 and the nonmagnetic part 24 can be formed in a circumferential size substantially equal to that of a part of the rotor core 21 between the bottom of the slit 23 and a permanent-magnet holding groove 28, which reduces the leakage flux of the permanent magnet 22.

Figure 7:
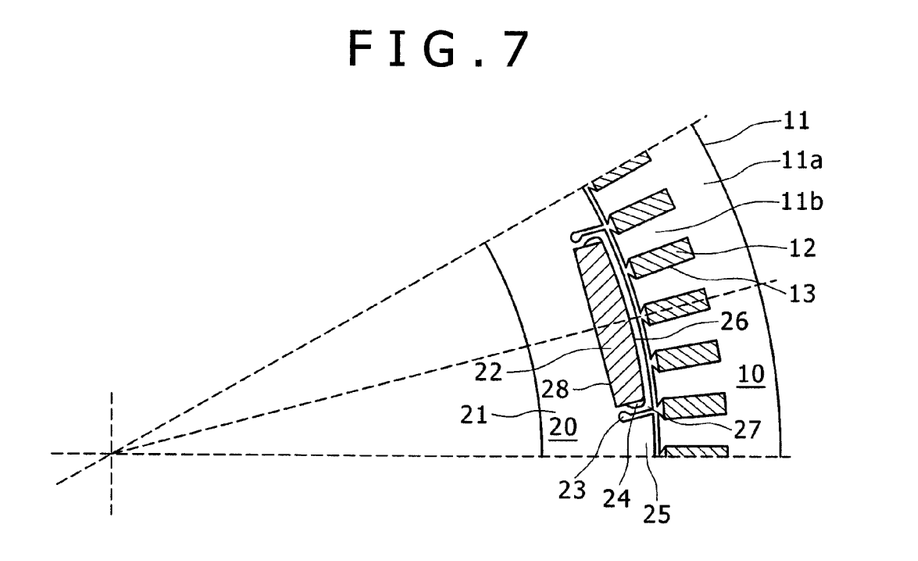
FIG. 7 is an enlarged, fragmentary cross-sectional view of a motor generator in a third embodiment.

FIG. 7 illustrates a motor generator MG1 in a third embodiment. Features other than those described below are the same as those of the motor generator MG1 in the first embodiment.

In this embodiment, permanent magnets 22 are not rectangular bars. The outer surfaces of the permanent magnets 22 have the shape of a part of the side surface of a circular cylinder. The effect of the motor generator MG1 in the third embodiment is the same as the motor generator MG1 in the first embodiment.

Figure 8:
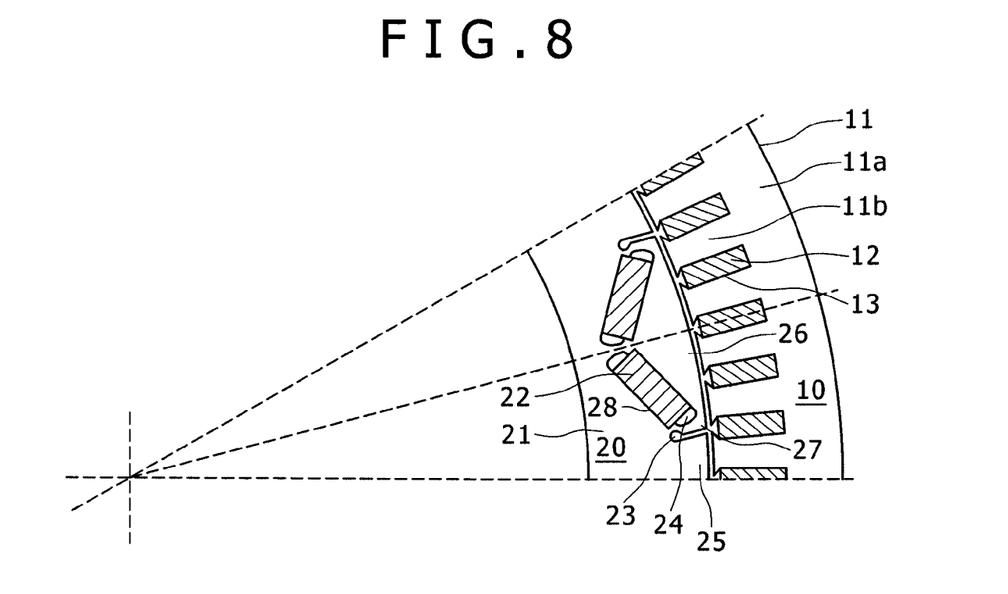
FIG. 8 is an enlarged, fragmentary cross-sectional view of a motor generator in a fourth embodiment.

FIG. 8 illustrates a motor generator MG1 in a fourth embodiment. Features other than those described below are the same as those of the motor generator MG1 in the first embodiment.

In this embodiment, two permanent magnets 22 disposed in a V-shape form one magnetic pole. The effect of the motor generator MG1 in the fourth embodiment in which the two permanent magnets 22 form one magnetic pole is the same as the motor generator MG1 in the first embodiment.

Figure 9:
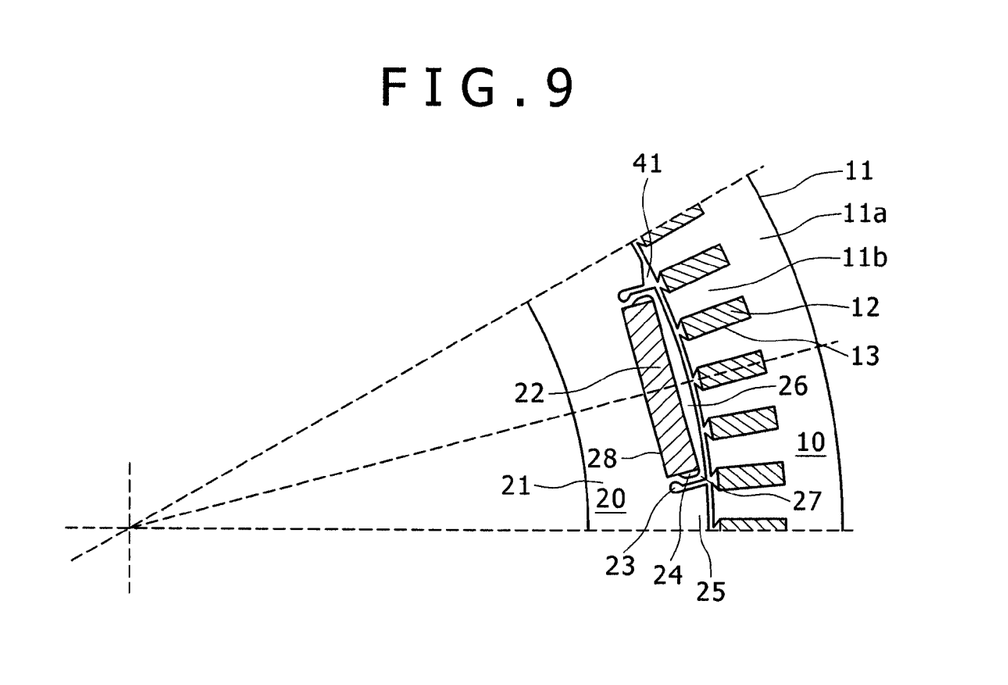
FIG. 9 is an enlarged, fragmentary cross-sectional view of a motor generator in a fifth embodiment.

FIG. 9 illustrates a motor generator MG1 in a fifth embodiment. Features other than those described below are the same as those of the motor generator MG1 in the first embodiment.

In this embodiment, a part of the rotor core 21 of a rotor 20 contiguous with the open end of one of two slits 23 respectively near the circumferentially opposite ends of a permanent magnet 22 is chamfered in a bevel 41 as illustrated in FIG. 9. The effect of the motor generator MG1 in the fifth embodiment is the same as the motor generator MG1 in the first embodiment. The bevels 41 reduces torque ripple when the motor generator MG1 operates.

The bevel 41 of this rotor 20 is a flat surface. The bevel 41 may be a curved surface, a polyhedral surface or a composite surface formed by combining curved surfaces and flat surfaces.

Figure 10:
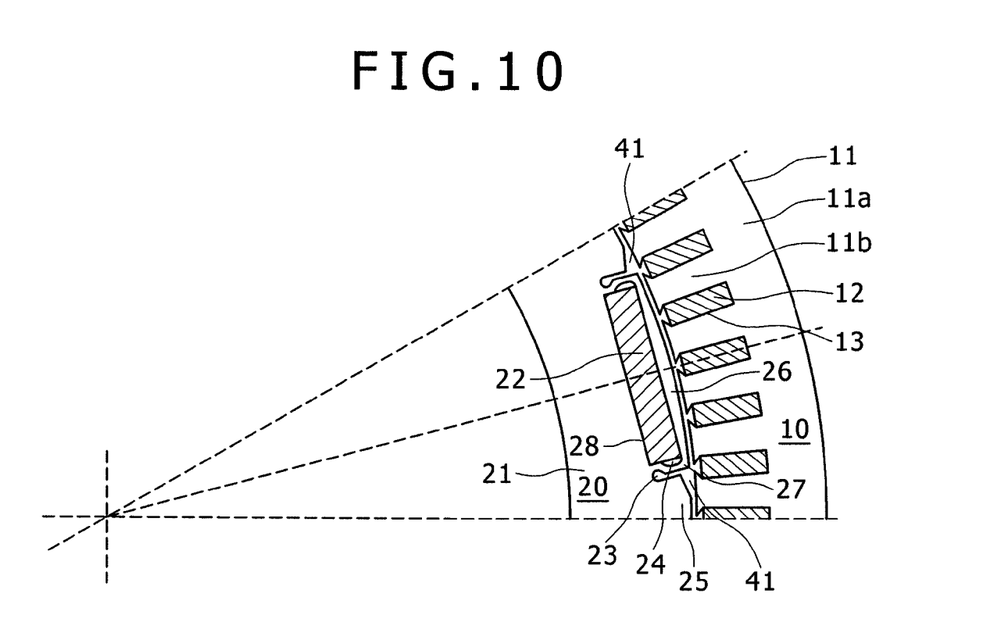
FIG. 10 is an enlarged, fragmentary cross-sectional view of a motor generator in a sixth embodiment.

FIG. 10 illustrates a motor generator MG1 in a sixth embodiment. Features other than those described below are the same as those of the motor generator MG1 in the first embodiment.

In this embodiment, parts of the rotor core 21 of a rotor 20 contiguous with the open ends of two slits 23 respectively near the circumferentially opposite ends of a permanent magnet 22 are chamfered in bevels 41, respectively, as illustrated in FIG. 10. The effect of the motor generator MG1 in the sixth embodiment is the same as the motor generator MG1 in the first embodiment. Conditions for the bevels 41 are the same as those for the bevels 41 of the motor generator MG1 in the fifth embodiment illustrated in FIG. 9.

Although high-tensile steel plates are expensive, the rotor cores of the rotors of the foregoing embodiments may be formed by stacking high-tensile steel plates.

In each of the foregoing embodiments, tensile stress induced in the rotor core is reduced to enable the rotor to operate at high rotating speeds and the magnetic flux of the permanent magnets are used effectively. Thus, the present invention provides the low-cost permanent-magnet-type electric rotating machine suitable for hybrid electric cars.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. An electric rotating machine comprising:
   a stator;
   a rotor having a rotor core and inserted in a bore formed in the stator such that an air gap is formed between the stator and the rotor; and
   magnetic poles circumferentially arranged in a peripheral portion of the rotor core of the rotor;
   wherein the rotor further comprises slits formed in the rotor core and extending between adjacent ones of the magnetic poles,
   wherein magnetic gap is formed between the magnetic poles and the rotor core,
   wherein the rotor core has portions, each extending between the slit and the magnetic pole, in which compressive stress is induced when stress is induced in the portions of the rotor core between the slit and the magnetic pole by centrifugal force produced when the rotor rotates and acting on the magnetic pole and a portion of the rotor core on the radially outer side of each magnetic pole,
   wherein a radial length from an outer surface of the rotor to a bottom of the slit is longer than a radial length from the outer surface of the rotor to an inner edge of the magnetic gap,
   wherein the slit has an open end to the surface of the rotor core, and the bottom of the slit swells circumferentially toward a center of the magnetic pole.

2. The electric rotating machine according to claim 1, wherein the stress induced in the portion between the slit and the magnetic pole is dispersed by the portion of the rotor core in which the compressive stress is induced.

3. The electric rotating machine according to claim 1, wherein the respective absolute values of the compressive stress and the tensile stress induced in the portion between the slit and the magnetic pole are equal.

4. The electric rotating machine according to claim 1, wherein a magnetic gap is formed between the adjacent ones of magnetic poles, and compressive stress is induced in portion between the slit and the magnetic gap.

5. The electric rotating machine according to claim 4, wherein the magnetic gap has a radial length shorter than that of at least one of the adjacent magnetic poles, the magnetic gap and the radially outer surface of the at least one magnetic pole are at substantially the same depth in a radial direction, a portion of the slit radially corresponding to the magnetic gap has a circumferential width substantially equal to a radial direction, and a portion of the slit on the diametrically inner side of the magnetic gap has a circumferential width greater than that of the portion corresponding to the magnetic gap.

6. The electric rotating machine according to claim 4, wherein a portion of the rotor core circumferentially contiguous with at least one of the adjacent magnetic poles has a curved portion curving from a position circumferentially contiguous with the magnetic gap toward the magnetic pole.

7. The electric rotating machine according to claim 1, wherein an edge of an open end of the slit farther from the magnetic pole is chambered.

8. The electric rotating machine according to claim 1, wherein a distance from an outer circumference of the rotor to a bottom of the slit is longer than a distance from the outer circumference of the rotor to a magnetic gap.

9. The electric rotating machine according to claim 8, wherein a bottom of the slit is nearer to a center of the magnetic pole than an open end of the slit.

10. The electric rotating machine according to claim 9, wherein a circumferential dimension along the circumference of the rotor of a portion of the rotor core extending between the slit and a nonmagnetic portion is substantially equal to that of a portion of the rotor core extending between the bottom of the slit and a permanent-magnet holding groove.

11. The electric rotating machine according to claim 1, wherein each of the portions of the rotor core extending between the adjacent magnetic poles functions as an auxiliary magnetic pole in which reluctance torque is produced by magnetomotive force of the stator.

12. The electric rotating machine according to claim 1, wherein each of the magnetic poles is formed by disposing a plurality of permanent magnets in circumferential arrangement in the same direction of magnetic pole.

13. A hybrid car driven by driving power of an internal combustion engine and driving power of the electric rotating machine according to claim 1.

* * * * *